United States Patent [19]

Jung

[11] Patent Number: 5,353,326

[45] Date of Patent: Oct. 4, 1994

[54] METHOD FOR PERFORMING CONTINUITY CHECK IN AN ELECTRONIC EXCHANGE SYSTEM

[75] Inventor: Jin-Su Jung, Kumi, Rep. of Korea

[73] Assignee: SamSung Electronics Co., Ltd., Suwon, Rep. of Korea

[21] Appl. No.: 871,026

[22] Filed: Apr. 20, 1992

[30] Foreign Application Priority Data

Apr. 23, 1991 [KR] Rep. of Korea .................. 1991-6511

[51] Int. Cl.⁵ .................. H04M 1/24; H04M 3/08; H04J 1/16
[52] U.S. Cl. .................. 379/6; 379/24; 379/26; 370/14; 370/16
[58] Field of Search .................. 379/24, 26, 29, 27, 379/6, 269, 268; 370/14, 16; 375/9

[56] References Cited

U.S. PATENT DOCUMENTS

| | | | |
|---|---|---|---|
| 4,024,359 | 5/1977 | De Marco et al. | 379/23 X |
| 4,421,955 | 12/1983 | Mori et al. | 379/269 |
| 4,421,955 | 12/1983 | Mori et al. | 379/269 |
| 4,566,093 | 1/1986 | Diaz | 379/6 X |
| 4,679,224 | 7/1987 | Lynch et al. | 379/26 |

*Primary Examiner*—Stephen Chin
*Assistant Examiner*—Paul Loomis
*Attorney, Agent, or Firm*—Robert E. Bushnell

[57] ABSTRACT

A method of performing a continuity check on a speech channel in an electronic exchange system includes indicating and transmitting a continuity check request on a continuity check indicator located in a head address message if characteristics of a trunk module turn out the continuity check request while handling an outgoing call to a counterpart, and connecting a speech channel with a continuity check tone transceiver to transmit therethrough a continuity check tone; monitoring whether the continuing check tone that was transmitted through a forward channel is received back through a backward channel within a predetermined time; and if said continuity check tone is received back, terminating transmission of the speech channel from the continuity check tone, causing a timer to stop counting, and disconnecting said continuity check tone transceiver.

17 Claims, 5 Drawing Sheets

METHOD FOR PERFORMING CONTINUITY CHECK IN AN ELECTRONIC EXCHANGE SYSTEM

BACKGROUND OF THE INVENTION

The present invention concerns a performing method for performing continuity check in an electronic exchange system and more particularly, to a method for performing the continuity check on a speech channel in an electronic exchange system which employs a common channel signalling system defined in the CCITT (Comité Consultatif Internationale Télégraphique et Téléphonique) Recommendation No. 7, wherein a digital signal channel is separated from the speech channel; therefore, a need arises for performing the continuity check of the speech channel in some instances.

Generally, in a conventional signalling method, the digital signal channel is not separated from the speech channel and further, a test for incoming/outgoing trunks is performed by a trunk routine check and an ACS (Automatic Call Sender) check. Moreover, the check method includes a method controlled by an operator's instruction and another method controlled by a scheduler, each having a step-by-step function, a repeated-check function for checking the incoming/outgoing trunks repeatedly when the testing result is a fault, and an ORJ (Operator Request Job) function for controlling the data concerning the above functions to meet the operator's need.

The check for the outgoing trunk according to the conventional signalling system is performed such that a test call performed by an MMC (Man-Machine Communication) section occupies an outgoing trunk to be checked from a TTM (Trunk Test Module) dominative system to test, while occupying the outgoing trunk, whether the trunk is in a good condition for the communication by analyzing a response signal from a counterpart.

The ACS test is a test in which a test call is automatically generated by means of a plurality of response keys (a maximum number of twenty keys) to check the performance (or quality) of the outgoing trunk. As the ACS test is performed, a counter for counting the number of the test increases. The counter according to the prior art has a function which stops counting upon an occurrence of a fault, upon a stop-instruction by the operator, or upon an occurrence of eight consecutive faults. Furthermore, there is a tracking function for monitoring the calling procedure on a step-by-step basis and a ACS-restart function.

Accordingly, the main purpose for the conventional trunk test is to test the transmission status or transmission quality of the incoming/outgoing trunks. The trunk test is an analog test such as a transmission test, a noise measurement test, a signal intensity test, a fading test, etc. Further, such tests are performed by means of a signal from a separate trunk.

It can be therefore readily understood that the conventional trunk test cannot be used for the CCITT No. 7 common signalling system in which the digital signal channel is separated from the speech channel.

SUMMARY OF THE INVENTION

It is therefore an object of the present invention to provide a method for performing a continuity check on a speech channel in an electronic exchange system employing the CCITT No. 7 signalling system.

It is another object of the present invention to provide a method for improving the reliability of the speech channel in an electronic exchange system.

According to an aspect of the present invention, a method of performing a continuity check on a speech channel in an electronic exchange system includes the steps of indicating and transmitting a continuity check request on a continuity check indicator located in a head address message if characteristics of a trunk module turn out the continuity check request while handling an outgoing call to a counterpart, and connecting a speech channel with a continuity check tone transceiver to transmit therethrough a continuity check tone; monitoring whether a the continuity data tone that was transmitted through a forward channel is received back through a backward channel within a predetermined time; and if the continuity check tone is received back, terminating transmission of the continuity check tone, causing a timer to stop counting, and disconnecting the continuity check tone transceiver.

BRIEF DESCRIPTION OF THE ACCOMPANYING DRAWINGS

Further features and advantages will become more apparent from the following and a more particular description of the preferred embodiment of the invention will be set forth, as illustrated in the accompanying drawings in which.

DETAILED DESCRIPTION OF THE PREFERRED EMBODIMENT

Figure 1:
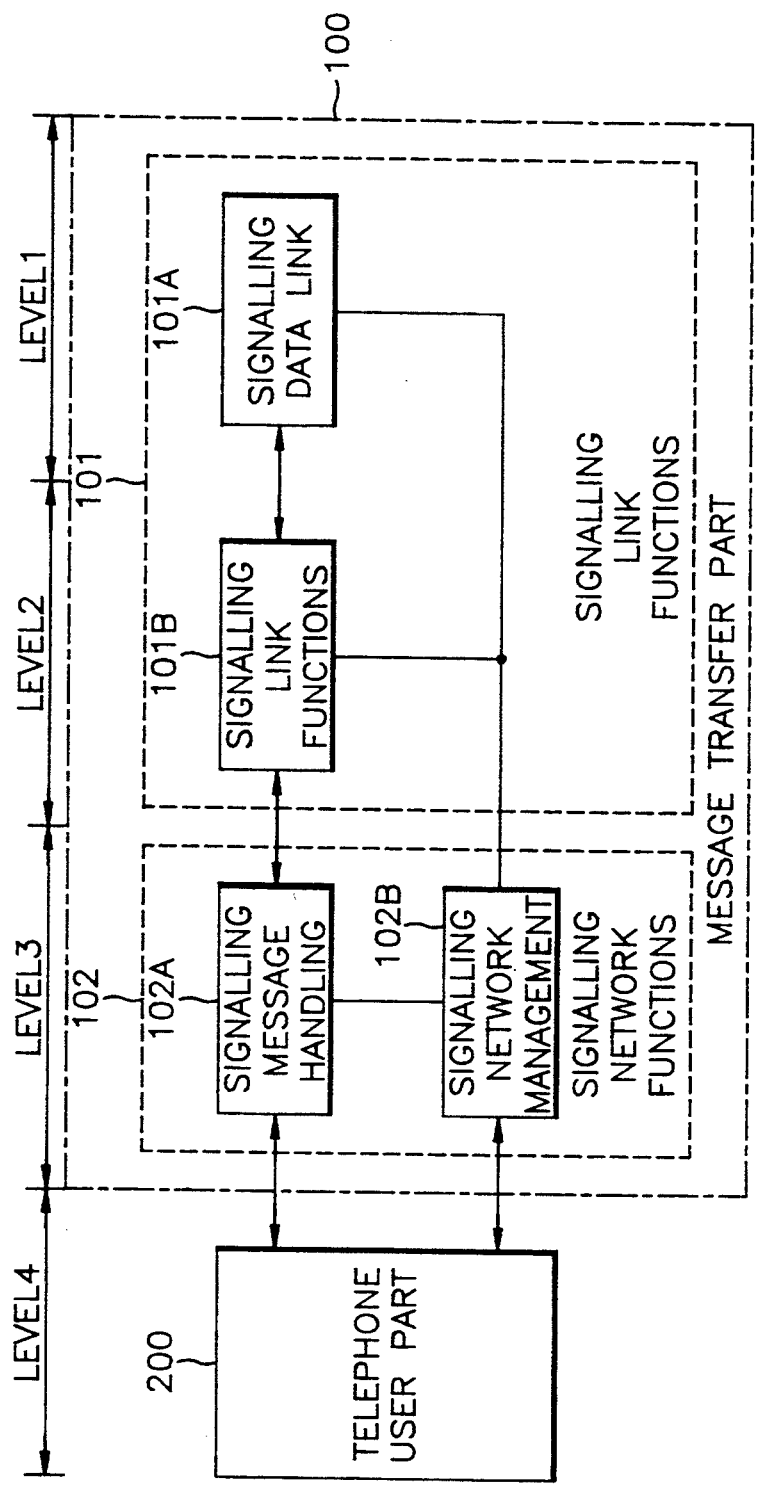
FIG. 1 shows a system block diagram of the CCITT No. 7 common channel signalling system to which the present invention may be applied.

Referring to FIG. 1, a message transfer part 100 includes function Levels 1 through 3 and a user telephone part 200 includes a function Level 4. The function Level 1 defines an access method to signalling data links 101A and the physical, electrical and functional characteristics of the signalling data links. The function Level 2 defines the functions and processes concerning a message transmission with a higher reliability through the respective signalling data links of the function Level 1. The function Level 3 defines common and/or individual functions and processes with respect to the respective signalling data link operations. Finally, the function Level 4 includes a plurality of different user parts defining the signalling method functions and signalling processes, each of the signalling method functions and signalling processes can be applied only for a specific user part.

According to the CCITT No. 7 common channel signalling system, the digital signal is transmitted and/or received through a private line, not through the telephone line, and the CCITT No. 7 common channel signalling system is a kind of an inter-office signalling system in which the private line is shared in common by a plurality of speech channels. It is generally well known that the common channel signalling system can transmit the digital signal independent of the call status and has plenty of calls and the call types with a high transmission speed, and is suitable for a digital signalling network, and that the number of communication channels can be reduced by means of using the speech channel bilaterally.

Figure 2:
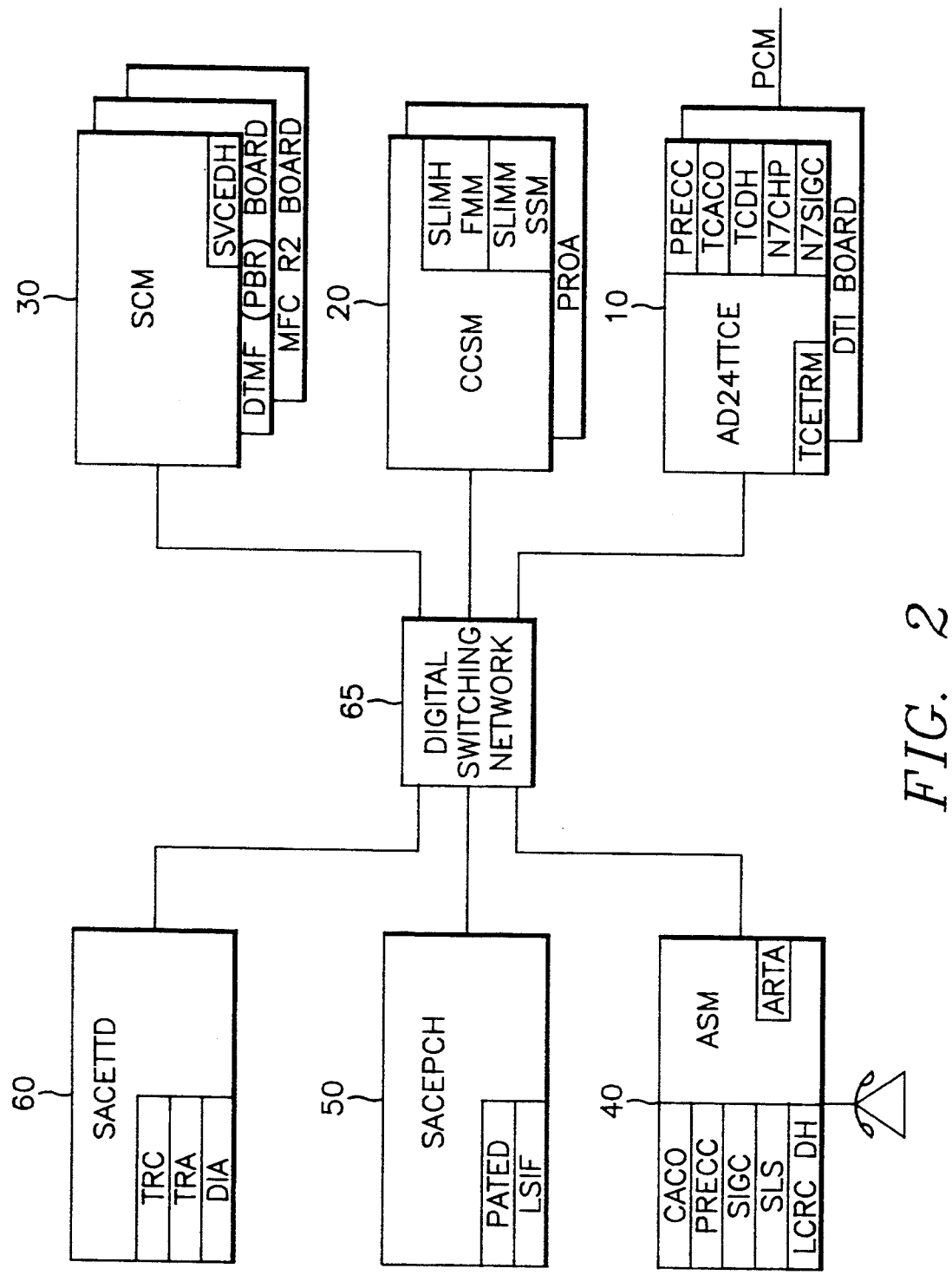
FIG. 2 shows a module block diagram of the common channel signalling system according to the present invention.

Referring to FIG. 2, the CCITT No. 7 common channel signalling system according to the present invention includes an AD24TTCE (advanced 24CH trunk terminal control element) 10 for checking and controlling the continuity of the speech channel, a common channel signalling module (CCSM) 20 for performing a message handling function in the function Levels 2 and 3 to transmit the message, a service circuit module (SCM) 30 for receiving/transmitting a continuity check tone, a prefix analyzing module (SACEPCH) 50 for detecting the incoming and outgoing calls of the subscriber to confirm whether the call is established successfully, an analog subscriber module (ASM) 40, a trunk sharing module (SACETTD) 60 for assigning trunks, and a digital switching network 65.

The respective modules stated above will be described hereinbelow in more detail. The analog subscriber module 40 detects the incoming and outgoing calls of the subscriber to determine, through the prefix analyzing module 50, whether to connect the call to a subscriber coupled to its own exchange system or to connect the call to a subscriber coupled to another exchange system. The service circuit module 30 connects with a DTMF (Dual Tone Multi-frequency) board for receiving the subscriber's digit in the case that the subscriber's phone is a MFC (Multi-Frequency Code) phone connected to the analog subscriber module 40, and further, drives a circuit (MFC-R2; MFC register 2) for generating and/or receiving a continuity check tone signal to test the continuity, which is the chief function of the present invention. The common channel signalling module 20 is for performing a message transfer function Level 2 and the message handling function of a message transfer function Level 3, wherein message discrimination, message distribution, message routing, signalling link manager, signalling link activation, signalling link deactivation, updating local routing table, etc. are designed according to the CCITT recommendation Q701 through Q704. The AD24TTCE 10 is for processing various types of the trunk calls and has hardware and software functions so as to process an R2 call a, TUP N7 (Telephone User Part No. 7) call and a ISUP N7 (ISDN User Part No. 7) call. In particular, the AD24TTCE 10 includes a No. 7 signalling module (N7SIGC) for handling the TUP N7 call signals, N7 CHP (No. 7 Call Handling Part) for controlling the TUP N7 call, and a TCDH (Trunk Circuit Device Handling) for identifying the characteristics of the various types of the trunk calls.

Figure 3A:
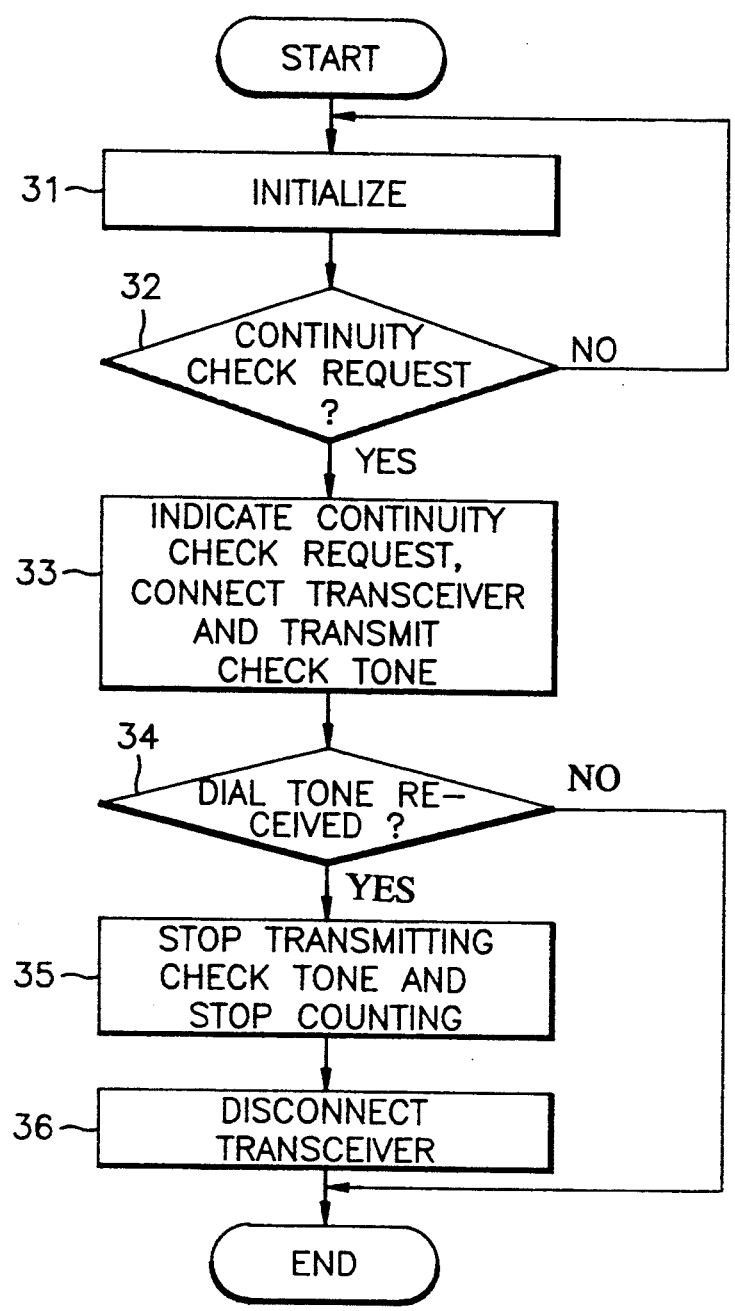
FIGS. 3A and 3B show control flowcharts according to the present invention.
Figure 3B:
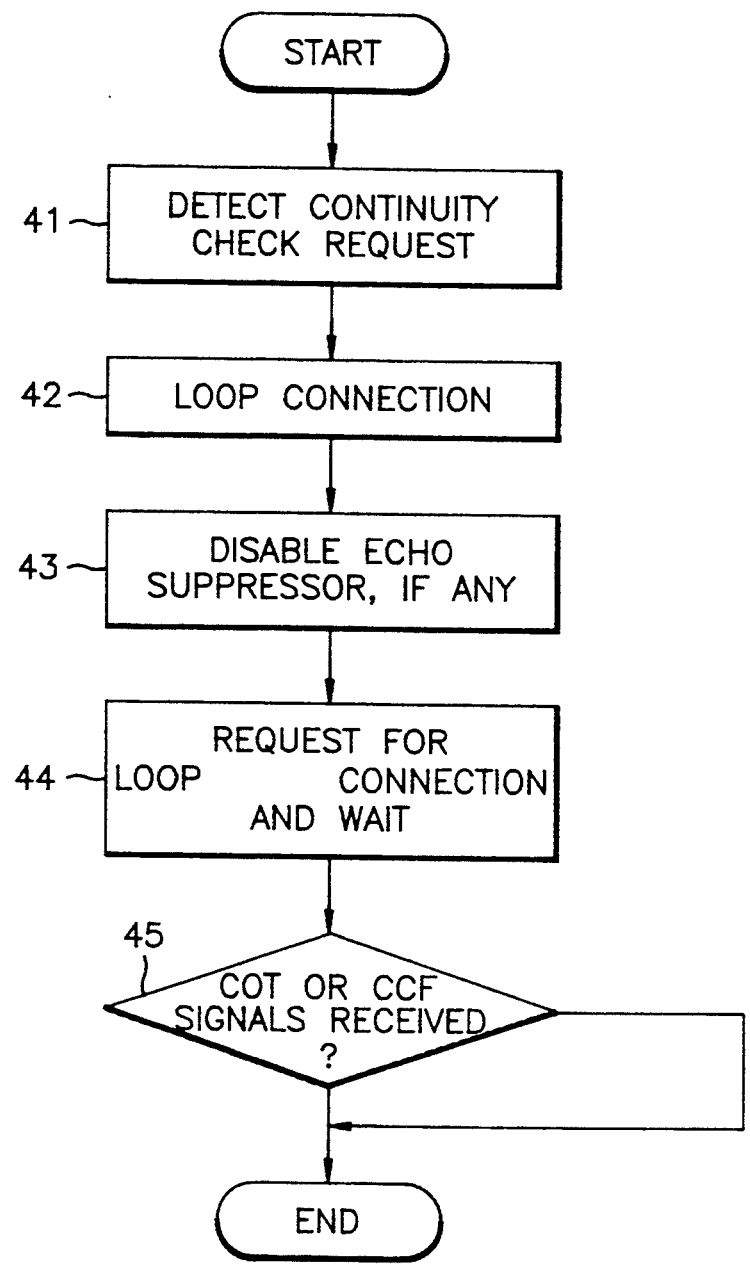

Referring to FIGS. 3A and 3B, the operation of the present invention will be described hereinbelow in detail. It is shown in FIG. 3A that if the characteristics of the trunk turn out "continuity check request" while the outgoing call to the counterpart is being handled, such status is indicated on a continuity check indicator located in a head address message (i.e., the header of the message) to be transmitted and the trunk call is connected with a continuity check tone transceiver of the service circuit module 30 (See steps 31 through 33). During the continuity check, if a continuity check tone that was transmitted through a forward channel is received back within a predetermined time (preferably, 2 seconds) through a backward channel, the continuity check is regarded as a success (See step 34). Consecutively, the timer stops counting and the continuity check tone transceiver is disconnected to complete the continuity check (See steps 35 and 36).

If, however, the continuity check tone for the continuity check is not received back within the predetermined time, the continuity check is regarded as a failure, and the continuity check tone generation is halted and consecutively, the continuity check tone transceiver is disconnected to complete the continuity check.

Additionally, the continuity check tone generation is halted and the continuity check tone transceiver is disconnected to complete the continuity check, only after an address completion signal, a response signal or a signal indicating that the call establishment is unavailable is received while the continuity check tone transceiver is connected.

In FIG. 3B, a process is shown which reveals how an exchange system that received the continuity check request deals with the continuity check request. If the continuity check request indicated on the continuity check indicator located in the head address message is detected, (step 41) a speech channel is connected with the counterpart exchange system in order to perform the continuity check (step 42), an echo suppressor, if existing between link offices, is disabled (step 43), and the N7CHP (No. 7 Call Handling Part) delivers the continuity check request to a PRECC (Preselection Call Control FMM (Finite Message Machine)) thereof and requests TCDH (Trunk Circuit Device Handling) for the continuity loop connection (step 44). The continuity loop connection is released, if a COT (Class of Trunk) signal, a CCF (continuity-check failure) signal, a CLF (clear forward) signal, or a signal indicative of the failure of the call establishment is received (step 45).

Figure 4A:
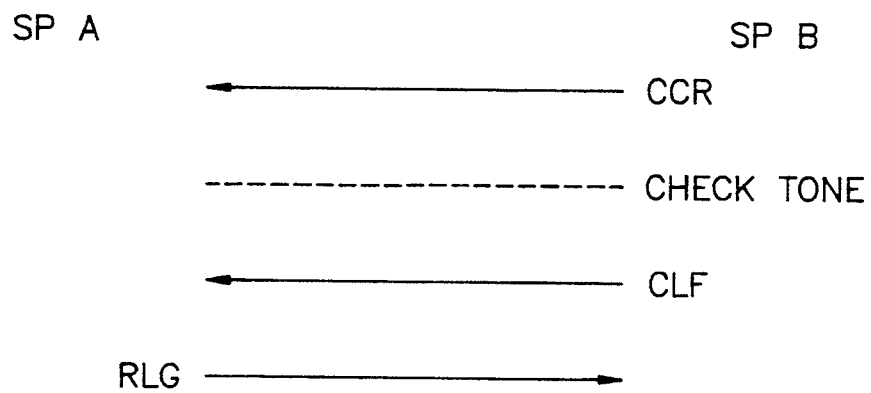
FIGS. 4A and 4B are flowcharts for showing two different methods of the continuity check message flow according to the present invention.
Figure 4B:
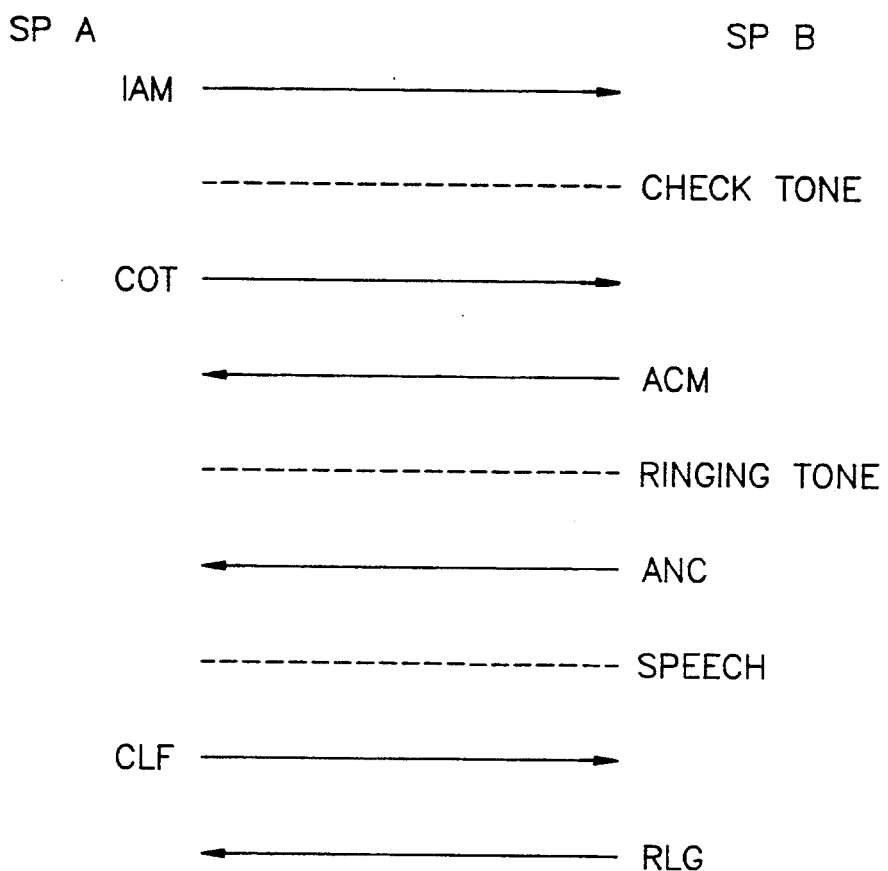

With reference to FIGS. 4A and 4B, two different message flows between the telephone offices SP-A (Signalling Point A) and SP-B (Signalling Point B) will be described hereinbelow. As shown in FIG. 4A, the first method for the continuity check message flow is concerned about an independent continuity check (a continuity check by the operator), and is a stage for the continuity check in a single interval (an interval having no switching office between central offices) regardless of the call. It is further required for the channels to be in a idle state before the continuity check. The first method is performed by means of a CCR (Continuity Check Request) signal. In order to perform the continuity check independently with respect to the channel in the idle stage, the continuity check request exchange system SP-B transmits the continuity check request (CCR) message and connects with the continuity check tone transceiver. Furthermore, the counterpart's exchange system SP-A connects with the continuity check-loop upon receipt of the continuity check request message.

If the continuity check tone or its frequency received back through the backward channel lies within a predetermined effective range, the continuity check request exchange system SP-B considers the continuity check as a success. Consecutively, the continuity check tone transceiver is disconnected and the CLF (Clear Forward) message is sent to the counterpart's exchange system SP-A. In the meanwhile, the request exchange system SP-B puts the channel in the idle state to complete the continuity check, if a RLG (Release Guard) signal is received back.

As described in FIG. 4B, the second method for the continuity check message flow is concerned about the continuity check by the outgoing trunk call and begins with the call establishment. If the outgoing trunk exchange SP-A determines to perform the continuity check, the continuity check request is indicated on the continuity check indicator located in the head address message to be transmitted and the speech channel is connected with a continuity check tone transceiver. Then, the incoming trunk exchange SP-B connects the continuity check-loop with the corresponding speech channel upon receipt of the continuity check request. If the continuity check is terminated, the outgoing trunk exchange SP-A transmits a COT (Class of Trunk) message to have the incoming trunk exchange SP-B release the continuity check-loop. Then, the incoming trunk exchange SP-B releases the continuity check-loop, sends an ACM (Address Complete Message indicating receiving completion of the incoming exchange) message to the outgoing trunk exchange SP-A, and sends the ringing tone to the subscriber in the called part. Thereafter, if the subscriber of the called part hooks-off the earphone, the incoming trunk exchange SP-B sends an ANC (Answer Charging) message to the outgoing trunk exchange SP-A, notifying outgoing truck exchange SP-A about the hook-off state of the subscriber of the called part. Thus, the speech communication is established between the subscribers of the outgoing and incoming trunk exchanges SP-A, SP-B. If thereafter the speech communication is completed (in the case where the subscriber of the outgoing trunk exchange SP-A first finishes the speech communication), the outgoing trunk exchange SP-A generates the CLF signal to the incoming trunk exchange SP-B to notify the incoming trunk exchange SP-B that the forward channel is released. Then, the incoming trunk exchange SP-B transmits the RLG (Release Guard) signal to the outgoing trunk exchange SP-A to notify the trunk exchange SP-A of the release state. Thus, the communication is completed.

Furthermore, according to the present invention, the frequency of the continuity check signal tone is preferably 2,000±20 Hz and the transmission level is −12±1 dB. It is also required that the transceiver and check-loop have no losses.

As described heretofore, the present invention can perform the continuity check on the speech channel in the CCITT No. 7 common signalling system and thus can improve the reliability of the system.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method of performing a continuity check on a speech channel in an electronic exchange system, comprising the steps of:
   indicating and transmitting a continuity check request on a continuity check indicator located in a head address message if characteristics of a trunk module turn out the continuity check request while handling an outgoing call to a counterpart, and connecting the speech channel with a continuity check tone transceiver generate and to transmit a from a first subscriber through a transmission channel to a second subscriber continuity check tone;
   monitoring whether the continuity check tone generated from said first subscriber and transmitted through said transmission channel to said second subscriber is received back through a reception channel within a predetermined time, said transmission channel and said reception channel forming said speech channel in said electronic exchange system; and
   if said continuity check tone is received back within said predetermined time, terminating transmission of said continuity check tone, causing a timer to stop counting, and disconnecting said continuity check tone transceiver, wherein said predetermined time within which said continuity check tone is received back is two second.

2. An apparatus for performing a continuity check on a speech channel in an electronic exchange system utilizing a common channel signalling system, wherein a digital signal channel is separated from the speech channel, said apparatus comprising:
   trunk control means for checking and controlling a continuity of the speech channel by generating a continuity check request;
   common channel signalling means for transmitting call messages, said common channeling signalling means further performing message discrimination, message distribution, message routing, signalling a link manager, signalling link activation, signalling link deactivation and updating local routing table functions;
   service circuit means for generating and receiving a continuity check tone in response to said continuity check request;
   means for detecting a trunk call of a first subscriber, in order to confirm whether said trunk call has been established;
   trunk sharing means for enabling a plurality of the speech channels to be carried within a trunk module; and
   digital switching means for interfacing said trunk control means, common channel signalling means, service circuit means, means for detecting a trunk call, and trunk sharing means.

3. The apparatus as claimed in claim 2, wherein said trunk control means comprises:
   trunk circuit device handling means for identifying characteristics of a plurality of types of trunk calls;
   processing means for processing an first type trunk call, a second type trunk call, and a third type trunk call;
   signalling module means for handling said second type trunk call; and
   call handling means for controlling said second type trunk call.

4. The apparatus as claimed in claim 2, wherein said means for detecting a trunk call comprises:
   prefix analyzing means for making a determination whether said trunk call has been established successfully; and
   analog subscriber means for connecting said trunk call to a second subscriber coupled to a first exchange system used by said first subscriber, and for connecting said trunk call to said second subscriber coupled to a second exchange system different from said first exchange system used by said first subscriber.

5. The apparatus as claimed in claim 2, wherein a continuity check tone transceiver of said service circuit means is connected with said trunk call when said continuity check request is indicated on a continuity check indicator located in a header of one of said call messages.

6. The apparatus as claimed in claim 4, wherein a continuity check tone transceiver of said service circuit means is connected with said trunk call when said continuity check request is indicated on a continuity check indicator located in a header of one of said call messages.

7. A method of performing a continuity check on a speech channel in an electronic exchange system utilizing a common channel signalling system, wherein a digital channel is separated from the speech channel, said method comprising:
   transmitting a continuity check request on a continuity check indicator located in a header of a call message if a first trunk module generates said continuity check request while handling an outgoing trunk call to a second trunk module located within one of said electronic exchange system and a different electronic exchange system by making a determination if said continuity check request is on said continuity check indicator, delivering said continuity check request to a preselection call control, and requesting a continuity loop connection;
   connecting the speech channel with a continuity check tone transceiver to transmit a continuity check tone on the speech channel;
   making a determination whether said continuity check tone transmitted on a forward channel of the speech channel is received back through a back channel of the speech channel within a predetermined amount of time; and
   terminating transmission of said continuity check tone, stopping a timer from counting and disconnecting said continuity check tone transceiver from said speech channel if said continuity check tone is received back through said back channel within said predetermined amount of time.

8. The method as claimed in claim 7, wherein said step of transmitting a continuity check request further comprises:
   making a determination if said continuity check request is on said continuity check indicator;
   delivering said continuity check request to a preselection call control; and
   requesting a continuity loop connection.

9. A method of establishing continuity check message flow between a first and a second electronic exchange system utilizing a common channel signalling system, wherein a continuity check of an idle speech channel is performed, said method comprising:
   transmitting a continuity check request from said second electronic exchange system to said first electronic exchange system;
   connecting said second electronic exchange system with a continuity check tone transceiver;
   connecting said first electronic exchange system with a continuity check-loop upon receipt of said continuity check request from said second electronic exchange system;
   disconnecting said second electronic exchange system from said continuity check tone transceiver and sending a clear forward message from said second electronic exchange system to said first electronic exchange system, if a continuity check tone transmitted through a transmission channel of the speech channel by said continuity check tone transceiver is received through a reception channel of the speech channel within a predetermined amount of time;
   placing the speech channel back to said idle state if said second exchange system receives a release guard signal; and
   disconnecting said second electronic exchange system from said continuity check tone transceiver, if said continuity check tone transmitted through said forward channel of the speech channel is not received back through said back channel of the channel within said predetermined amount of time.

10. A method of establishing continuity check message flow between outgoing and incoming electronic exchange systems utilizing a common channel signalling system, wherein a continuity check of an engaged speech channel is performed, said method comprising:
    indicating a continuity check request on a continuity check indicator located in a head address message and connecting said engaged speech channel to a continuity check tone transceiver, if said outgoing electronic exchange system makes a determination to perform the continuity check;
    connecting a continuity check-loop with said engaged speech channel upon receipt of said continuity check request by said incoming electronic exchange system;
    transmitting a class of trunk message from said outgoing electronic exchange to said incoming electronic exchange to release said continuity check-loop, having said incoming electronic exchange release said continuity check-loop, sending an address complete message to said outgoing electronic exchange and sending a ringing tone to a called subscriber, if said continuity check is terminated;
    sending an answer charging message from said incoming electronic exchange to said outgoing electronic exchange and establishing a speech connection between said incoming and outgoing electronic exchanges, if said called subscriber picks up a receiver;
    sending a clear forward signal from said outgoing electronic exchange to said incoming electronic exchange if a calling subscriber hangs up before said called subscriber to indicate that a forward channel of said engaged speech channel is released; and
    sending a release guard signal from said incoming electronic exchange to said outgoing electronic exchange to indicate that said speech communication is completed.

11. A circuit for performing a continuity check on a speech channel in an electronic exchange system utilizing a common channel signalling system, said circuit comprising:
    means for checking and controlling a continuity of said speech channel by generating a continuity check request;
    common channel signalling means for performing message transmission functions and processes pertaining to a message transmission through signalling data links, and performing common and individual functions and processes pertaining to said signalling data links;

means for transmitting and receiving a continuity check tone to test said continuity of said speech channel in response to said continuity check request;

tinting means for measuring an amount of time for said means for transmitting and receiving a continuity check tone to receive said continuity check tone after transmitting said continuity check tone;

means for detecting incoming and outgoing calls of a first subscriber of said electronic exchange system; and digital switch means for interfacing said means for checking and controlling a continuity of said speech channel, said common channel signalling means, said means for transmitting and receiving a continuity check tone and said means for detecting incoming and outgoing calls of a first subscriber.

12. The circuit as claimed in claim 11, wherein said means for receiving and transmitting a continuity check tone connects with a dual tone multi-frequency board for receiving a digit of said first subscriber when a phone of said first subscriber is a multi-frequency code phone connected to an analog subscriber module of said means for detecting incoming and outgoing calls.

13. The circuit as claimed in claim 12, wherein said analog subscriber module detects said incoming and outgoing calls to determine, through a prefix analyzing module, whether to connect said incoming and outgoing calls to a second subscriber of one of said electronic exchange system and a remote exchange system.

14. The circuit as claimed in claim 11, wherein said means for checking and controlling a continuity of a speech channel, comprises:

identification means for identifying characteristics of a plurality of trunk call types to generate said continuity check request; and processing means for handling and controlling said plurality of trunk call types.

15. The circuit as claimed in claim 14, wherein said plurality of trunk call types comprise:

an first call;

a second call; and a third call.

16. The circuit as claimed in claim 2, wherein said trunk control means identifies characteristics of a given type of trunk call and generates said continuity check request in response to said characteristics.

17. The method as claimed in claim 9, wherein said second electronic exchange system is disconnected from said continuity check tone transceiver only when one of an address completion signal, a response signal, and a signal indicating that call establishment is unavailable, is received by said second electronic exchange system.

* * * * *

UNITED STATES PATENT AND TRADEMARK OFFICE
CERTIFICATE OF CORRECTION

PATENT NO. : 5,353,326
DATED     : October 4, 1994
INVENTOR(S) : Jin-Su Jung

It is certified that error appears in the above-indentified patent and that said Letters Patent is hereby corrected as shown below:

Column 1, line 6, delete "performing", and line 7, after "performing" insert --a--.
Column 2, line 46, change "user telephone" to --telephone user--.
Column 3, line 49, change "call a, " to --call, a--.
Column 4, line 26, delete ",", and before "a", insert --,--.
Column 6, line 1, delete "to" and "a", and after "transceiver", insert-- to--; line 18, change "second" to --seconds--, and Signed and Sealed this Eleventh Day of July, 1995

Attest:

BRUCE LEHMAN

*Attesting Officer*   *Commissioner of Patents and Trademarks*